(12) United States Patent
Hiramatsu (10) Patent No.: US 8,905,439 B2
(45) Date of Patent: Dec. 9, 2014

(54) RETRACTOR DEVICE FOR SEATBELT, AND SEATBELT DEVICE

(75) Inventor: Koji Hiramatsu, Tokyo (JP)

(73) Assignee: Takata Corporation, Tokyo (JP)

(*) Notice: Subject to any disclaimer, the term of this patent is extended or adjusted under 35 U.S.C. 154(b) by 0 days.

(21) Appl. No.: 14/237,529

(22) PCT Filed: Jul. 17, 2012

(86) PCT No.: PCT/JP2012/068093
§ 371 (c)(1),
(2), (4) Date: Feb. 6, 2014

(87) PCT Pub. No.: WO2013/021787
PCT Pub. Date: Feb. 14, 2013

(65) Prior Publication Data
US 2014/0203620 A1    Jul. 24, 2014

(30) Foreign Application Priority Data

Aug. 9, 2011   (JP) .................................. 2011-173829

(51) Int. Cl.
*B60R 22/28* (2006.01)
*B60R 22/34* (2006.01)
*B60R 22/46* (2006.01)

(52) U.S. Cl.
CPC ......... *B60R 22/341* (2013.01); *B60R 2022/286* (2013.01); *B60R 22/4676* (2013.01)
USPC ......... 280/805; 297/472; 297/475; 242/379.1

(58) Field of Classification Search
CPC .............. B60R 22/341; B60R 22/4676; B60R 2022/286; B60R 2022/287
USPC .................. 280/805; 242/379.1; 297/472, 475
See application file for complete search history.

(56) References Cited

U.S. PATENT DOCUMENTS 4,323,205 A * 4/1982 Tsuge et al. ............... 242/379.1
5,618,006 A * 4/1997 Sayles ....................... 242/379.1

(Continued)

FOREIGN PATENT DOCUMENTS

| JP | 2005-047449 | 2/2005 |
| JP | 2005-170266 | 6/2005 |

(Continued)

*Primary Examiner* — Ruth Ilan
(74) *Attorney, Agent, or Firm* — Foley & Lardner LLP (57) ABSTRACT

A torsion bar capable of torsional deformation, a ring arranged at a shaft end portion of a spool and connected rotatably integrally with an outer peripheral portion on the other side in an axial direction of the torsion bar, a plastic-deformable plate member having one end side fixed to an outer peripheral portion of the ring and the other end side being a free end in the vicinity of an inner peripheral portion of the shaft end portion of the spool, and a projecting portion which projects from an inner peripheral surface of the spool, which is brought into contact with the other end of the plate member after the torsion bar starts rotating integrally with the spool and an impact absorbing load of the torsion bar becomes constant due to torsional deformation, and which imparts a load for plastically deforming the plate member in further rotation of the spool.

5 Claims, 10 Drawing Sheets

(56) References Cited

U.S. PATENT DOCUMENTS

| | | |
|---|---|---|
| 2004/0206844 A1 | 10/2004 | Shiotani et al. |
| 2008/0099594 A1 | 5/2008 | Hiramatsu |
| 2010/0117437 A1* | 5/2010 | Hiramatsu et al. ............ 297/472 |
| 2010/0123348 A1* | 5/2010 | Hiramatsu et al. ............ 297/476 |
| 2011/0248489 A1* | 10/2011 | Moro ............................. 280/805 |
| 2013/0327875 A1* | 12/2013 | Lee et al. .................... 242/379.1 |

FOREIGN PATENT DOCUMENTS

| | | |
|---|---|---|
| JP | 2006-341711 | 12/2006 |
| JP | 2008-114659 | 5/2008 |
| JP | 2008114659 | 5/2008 |
| JP | 2010-089528 | 4/2010 |
| JP | 2010-111305 | 5/2010 |

* cited by examiner

FIG. 10

RETRACTOR DEVICE FOR SEATBELT, AND SEATBELT DEVICE

CROSS REFERENCE TO RELATED APPLICATIONS

The present application is a U.S. National Stage of International Application No. PCT/JP2012/068093 filed on Jul. 17, 2012, which claims the benefit of Japanese Patent Application No. 2011-173829 filed on Aug. 9, 2011. The entire disclosures of which are incorporated herein by reference.

BACKGROUND OF THE INVENTION

1. Field of the Invention

The present invention relates to a retractor device for a seatbelt that can wind a seatbelt and a seatbelt device having the same.

2. Description of the Related Art

A seatbelt device provided on a seat of a vehicle generally has a retractor device for a seatbelt which winds one side of a seatbelt (webbing) capable of being extracted, a tongue provided at the seatbelt, and a buckle device for causing an occupant to wear the seatbelt.

The retractor device for a seatbelt retracts the seatbelt inside by winding it around a winding member (spool) by using a spring force, locks extracting of the seatbelt from the winding member at a collision when an impact acts, and restrains the body of the occupant who is rapidly moving forward with this locked seatbelt. At this time, since the occupant moving forward is rapidly restrained, a load by a reaction of the restraint acts on the chest part or the like of the occupant through the seatbelt. In order to alleviate the load applied onto the occupant, a method in which a predetermined tensile load of the seatbelt is held while predetermined feeding-out resistance or more is applied on the seatbelt immediately after the lock, and the seatbelt is fed out by a predetermined length in that state so as to absorb collision energy acting on the occupant (Energy Absorption; hereinafter referred to as "EA" as appropriate) has been known.

For example, in a retractor device described in JP, A, 2010-089528, an EA mechanism provided with a shaft member (torsion bar) is disclosed. That is, in this EA mechanism, one side end portion of a winding member is connected to a shaft member, and the other side end portion of the shaft member is locked at a collision so that the collision energy is absorbed by plastic deformation caused due to torsion of the shaft member.

SUMMARY OF THE INVENTION

In response to the recent various needs, a configuration in which energy absorbing characteristics in the EA mechanism of the retractor device can be easily optimized in accordance with a difference in a vehicle structure, a vehicle model and the like or a body build of an occupant and the like is in demand. With the retractor device in Patent Literature 1, such point is not given consideration. That is, the shaft member and a bending element are provided as members which are plastically deformed, but timings of the plastic deformation of them are substantially the same, and it was not possible to change the energy absorbing characteristics in a stepped manner by shifting the plastic deformation timings.

The present invention has an object to provide a retractor device for a seatbelt and a seatbelt device having the same which can change the energy absorbing characteristics and easily optimize them by shifting impact absorbing timing of the shaft member and impact absorbing timing of an impact absorbing member different from the shaft member from each other.

Means for Solving the Problem

In order to achieve the above-described object, according to the first invention of the present application, there is provided a retractor device for a seatbelt, comprising a substantially cylindrical member rotatable for winding the seatbelt, a shaft member capable of torsional deformation arranged coaxially on an inside of the substantially cylindrical member and connected rotatably integrally with the substantially cylindrical member, a plate mounting member arranged on a shaft end portion of the substantially cylindrical member and connected rotatably integrally with an outer peripheral portion of the shaft member on the other side in an axial direction, a lock mechanism which can prevent rotation of the plate mounting member in a seatbelt extracting direction, a plastic-deformable first plate member having one end side fixed to an outer peripheral portion of the plate mounting member and the other end side being a free end in the vicinity of an inner peripheral portion of the shaft end portion of the substantially cylindrical member, and a first projecting portion which is provided projecting from the inner peripheral surface of the substantially cylindrical member, which is brought into contact with the other end side of the first plate member after the shaft member starts rotating integrally with the substantially cylindrical member and an impact absorbing load of the shaft member becomes constant due to the torsional deformation, and which imparts a load for plastically deforming the first plate member in further rotation of the substantially cylindrical member.

With the retractor device for a seatbelt according the first invention of the present application, after the impact absorbing load of the shaft member becomes constant, an impact absorbing load by the plastic deformation of the first plate member is applied. By shifting the impact absorbing timing of the shaft member and the first plate member as above, it is possible to easily change the energy absorbing characteristics into a desired mode. As a result, the energy adsorbing characteristics can be easily optimized.

According to the second invention, in the retractor device according to the first invention, the other end portion of the first plate member and the first projecting portion are separated from each other by a ¼ round or more along a circumferential direction of the substantially cylindrical member.

As a result, a time period during which an impact absorbing load of the shaft member becomes constant can be sufficiently ensured.

According to the third invention, in the first or, the retractor device further comprises a second plate member capable of plastic deformation and having one end side fixed to the outer peripheral portion of the plate mounting member and the other end side being a free end in the vicinity of the inner peripheral portion of the shaft end portion of the substantially cylindrical member, and a second projecting portion which is provided projecting from a portion on a side opposite to a movement trajectory on the same round of the first plate member and the first projecting portion in the inner peripheral surface of the substantially cylindrical member until the first projecting portion is brought into contact with the other end side of the first plate member along with rotation of the substantially cylindrical member and which is brought into contact with the other end side of the second plate member so as to impart a load for plastically deforming the second plate member, wherein the second plate member is fixed to the outer peripheral portion of the plate mounting member so that a movement trajectory along with rotation of the substantially cylindrical member until the second projecting portion is brought into contact with the other end of the second plate member is shorter than the movement trajectory until the first projecting portion is brought into contact with the other end of the first plate member.

As a result, stepped impact absorption can be conducted further finely.

According to the fourth invention, in the retractor device according to the third invention, the second plate member is configured having a strength which allows easier plastic deformation than the first plate member.

As a result, the stepped impact absorption can be set further gently.

In order to achieve the above-described object, according to the fifth invention of the present invention, there is provided a seatbelt device comprising a seatbelt for restraining an occupant, a retractor device for the seatbelt which winds one side of the seatbelt, capable of being extracted, a tongue provided at the seatbelt, and a buckle device for causing the occupant to wear the seatbelt by being engaged with the tongue, wherein the retractor device of the seatbelt includes a substantially cylindrical member rotatable for winding the seatbelt, a shaft member capable of torsional deformation arranged coaxially on an inside of the substantially cylindrical member and connected rotatably integrally with the substantially cylindrical member, a plate mounting member arranged on a shaft end portion of the substantially cylindrical member and connected rotatably integrally with an outer peripheral portion of the shaft member on the other side in an axial direction, a lock mechanism which can prevent rotation of the plate mounting member in a seatbelt extracting direction, a plastic-deformable first plate member having one end side fixed to an outer peripheral portion of the plate mounting member and the other end side being a free end in the vicinity of an inner peripheral portion of the shaft end portion of the substantially cylindrical member, and a first projecting portion which is provided projecting from the inner peripheral surface of the substantially cylindrical member, which is brought into contact with the other end side of the first plate member after the shaft member starts rotating integrally with the substantially cylindrical member and an impact absorbing load of the shaft member becomes constant due to the torsional deformation, and which imparts a load for plastically deforming the first plate member in further rotation of the substantially cylindrical member.

Advantages of the Invention

According to the present invention, by shifting the impact absorbing timing of the shaft member and the impact absorbing timing of the first plate member which is an impact absorbing member different from the shaft member from each other, it is possible to change the energy absorbing characteristics of the entire retractor device and to easily optimize them.

DETAILED DESCRIPTION OF THE PREFERRED EMBODIMENTS

An embodiment of the present invention will be described below by referring to the attached drawings. The present embodiment is an example in which the present invention is applied to a seatbelt device of an automobile.

Figure 1:
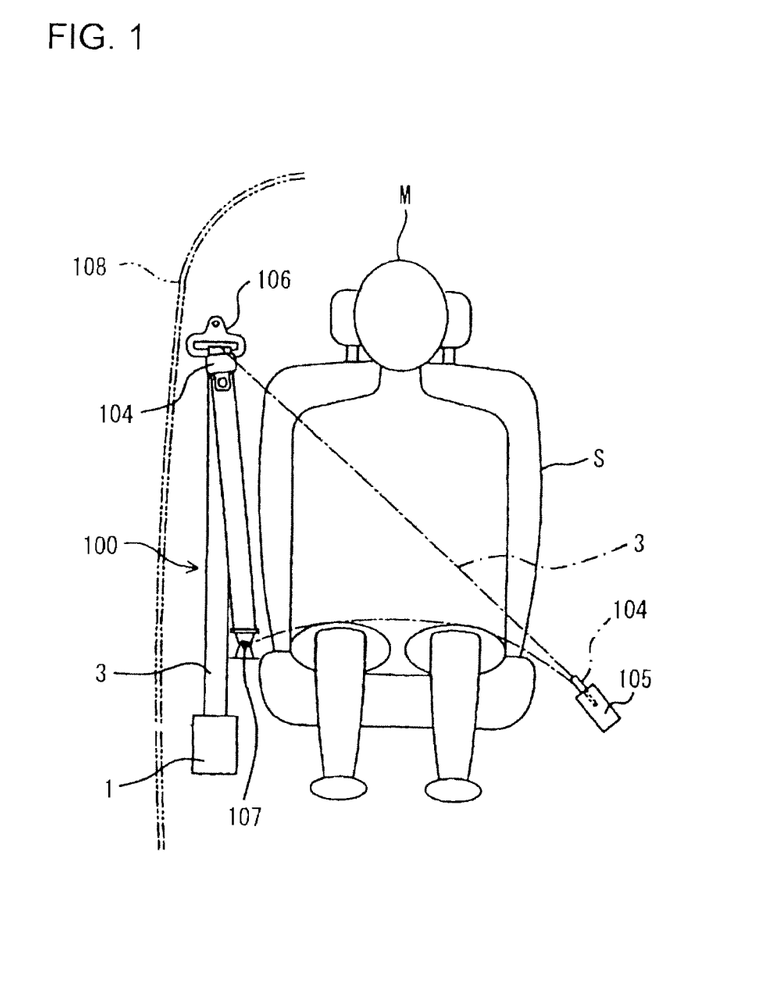
FIG. 1 is a front view illustrating an entire structure of a seatbelt device having a retractor device for a seatbelt of an embodiment of the present invention together with an occupant.

FIG. 1 is a front view illustrating an entire structure of the seatbelt device having a retractor device for a seatbelt of an embodiment of the present invention together with an occupant. In FIG. 1, a seatbelt device 100 is arranged in a vehicle body 108 of the vehicle and has a seatbelt 3 for restraining an occupant M to a seat S, a retractor device 1 of the present embodiment which winds one side of this seatbelt 3 capable of being extracted, a tongue 104 slidably provided at the seatbelt 3, and a buckle device 105 engaged with this tongue 104. The seatbelt 3 has its one side wound by the retractor device 1 as described above, is passed through a shoulder anchor 106 in the middle of the way, and the other side end portion is rotatably connected to a vehicle body 108 side by a stopper 107.

Figure 2:
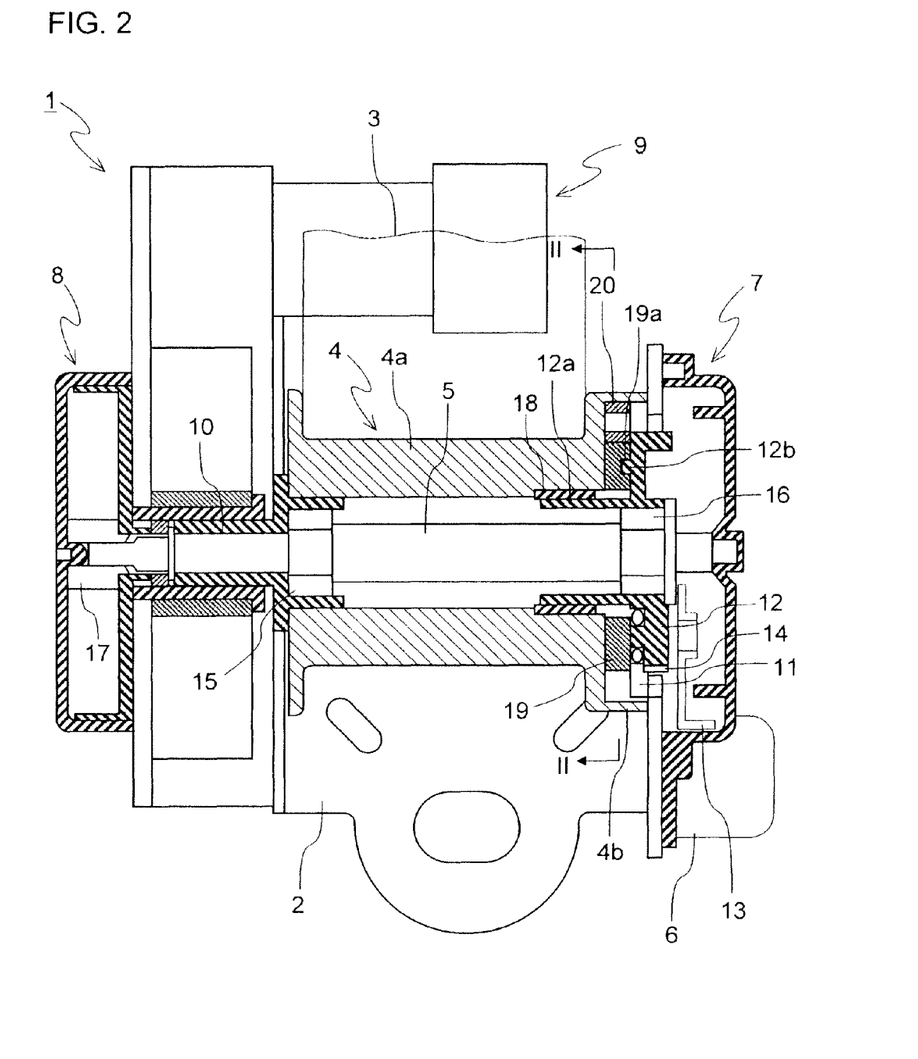
FIG. 2 is a longitudinal sectional view illustrating an entire outline structure of the retractor device of the present embodiment.

Subsequently, the retractor device 1 according to the present embodiment will be described in more detail by referring to FIGS. 2 to 9. FIG. 2 is a longitudinal sectional view illustrating an entire outline structure of the retractor device of the present embodiment.

In FIG. 2, this retractor device 1 has a frame 2, a substantially bobbin-shaped spool (substantially cylindrical member) 4 for winding the seatbelt 3, a substantially shaft-shaped torsion bar (shaft member) 5 formed of a material capable of torsional deformation, deceleration sensing means 6 operated upon sensing of a large vehicle deceleration generated in an emergency, a lock mechanism 7 for preventing rotation at least in a belt extracting direction of the spool 4, spring means 8 having a spiral spring (not shown), a pre-tensioner 9 operating in an emergency and generating a seatbelt winding torque, and a bush 10 for transmitting the seatbelt winding torque of the pre-tensioner 9 to the spool 4.

The lock mechanism 7 has a locking base 12 for holding a pawl 11 capable of swing and a lock gear 13. Since the lock gear 13 can have a known configuration, illustration of detailed structure is omitted, but the lock gear 13 rotates integrally with the torsion bar 5 in a normal time, while it stops by an operation of the deceleration sensing means 6 in an emergency and generates a relative rotational difference from the torsion bar 5, whereby the pawl 11 is engaged with an internal tooth 14 of a side wall of the frame 2. As a result, rotation of the locking base 12 (in other words, the spool 4) in the seatbelt extracting direction is prevented. At this time, the locking base 12 of the lock mechanism 7 is relatively rotated in the seatbelt extracting direction with respect to the lock gear 13 even at sudden extracting of the seatbelt 3, though detailed illustration is omitted, whereby extracting of the seatbelt 3 is prevented similarly to the above.

The torsion bar 5 is loosely fitted and arranged so as to be located on an inner periphery side of the spool 4 (coaxially) and to penetrate the same along an axial direction (hereinafter referred to simply as an "axial direction"). Moreover, the torsion bar 5 has a torque transmission portion 15 located on one end side in its axial direction (left side in FIG. 2) and engaged with the one end side in the axial direction of the spool 4, incapable of relative rotation, and a torque transmission portion 16 located on the other side in its axial direction (right side in FIG. 2) and engaged with the locking base 12, incapable of relative rotation (in other words, supported capable of rotation integrally with the locking base 12) and performs a function of interlocking rotation of the spool 4 with rotation of the lock mechanism 7.

The spool 4 has a body cylindrical portion 4a for winding the seatbelt 3 and a large-diameter cylindrical portion 4b having an outer diameter larger than this body cylindrical portion 4a and is rotatably supported between both side walls of the frame 2. Moreover, the spool 4 is urged to a winding direction of the seatbelt 3 all the time by a spring force of the spiral spring of the spring means 8 via a bush 17, the torsion bar 5, the torque transmission portion 15 of the torsion bar 5, and the bush 10. As the result of such structure, one side in the axial direction (left side in FIG. 2) of the torsion bar 5 is connected rotatably integrally with the spool 4. Moreover, when the pre-tensioner 9 is operated, the belt winding torque generated in the pre-tensioner 9 is transmitted to the spool 4 via the bush 10, whereby the spool 4 winds the seatbelt 3 by a predetermined amount.

An annular relative rotation lock member 18 is disposed between the spool 4 and a shaft portion 12a of the locking base 12. This relative rotation lock member 18 has a female screw (not shown) formed on an inner peripheral surface and is screwed with a male screw (not shown) formed on the locking base shaft portion 12a and also fitted in an axial hole of the spool 4 incapable of relative rotation and capable of axial movement. If the spool 4 relatively rotates in the belt extracting direction with respect to the locking base 12, the relative rotation lock member 18 rotates integrally with the spool 4 and moves to the right in FIG. 2.

Here, as the greatest feature of the present embodiment, a ring 19 (plate mounting member) arranged on the inner peripheral side of a right-side shaft end portion in FIG. 2 of the spool 4 and a plate member 20 (first plate member) capable of plastic deformation are provided.

The ring 19 has a substantially disk shape and is loosely fitted and arranged so that a center side in its radial direction is penetrated by the torsion bar 5 in the axial direction. Moreover, this ring 19 is connected rotatably integrally with an outer peripheral portion on the other side in the axial direction of the torsion bar 5 via the locking base 12 by engagement between an engagement recess portion 19a provided on a right side (locking base 12 side) in FIG. 2 with an engagement projecting portion 12b provided on a left side in FIG. 2 of the locking base 12.

Figure 3:
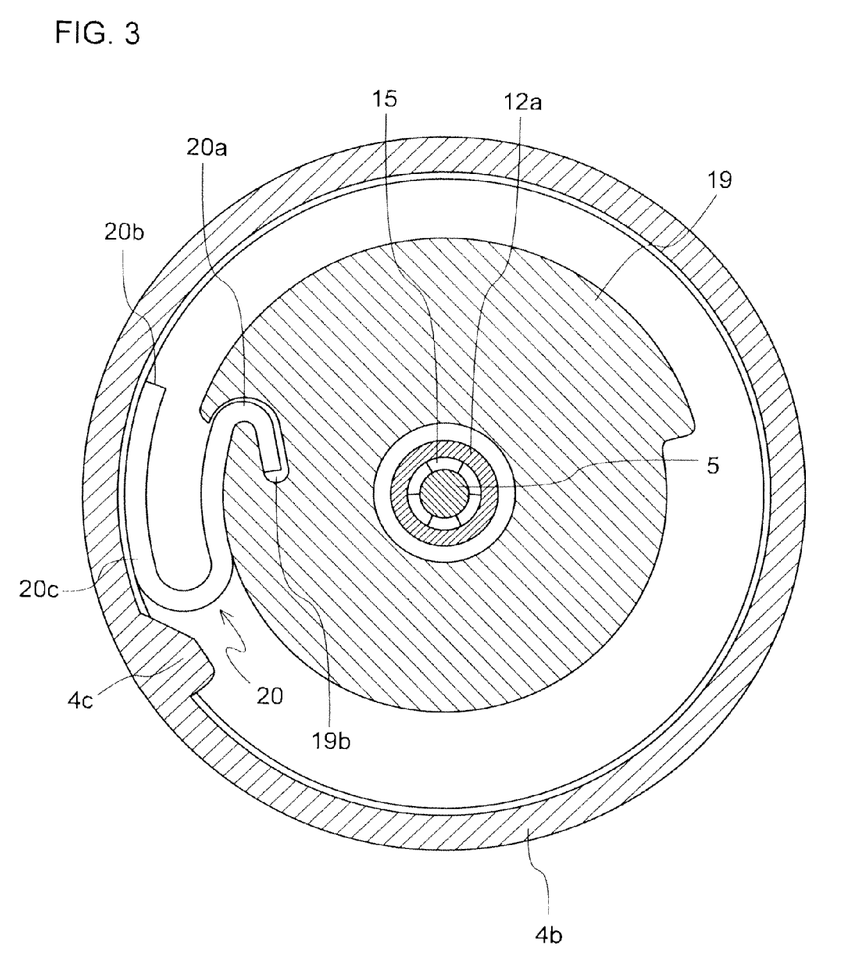
FIG. 3 is a cross sectional view on a II-II section in FIG. 2, illustrating a detailed mounting structure of a plate member.

FIG. 3 is a cross sectional view on a II-II section in FIG. 2, illustrating a detailed mounting structure of the plate member 20. FIG. 3 corresponds to a cross sectional view at a position corresponding to a point A in FIG. 8 which will be described later.

In FIG. 3, one end 20a of the plate member 20 (insides in the radial directions of the ring 19 and the spool 4) is firmly fitted and held by a fitting recess portion 19b having a substantially U-shaped portion opened to an outer periphery of the ring 19 by an appropriate method. Moreover, the other end 20b of the plate member 20 (free end on outsides in the radial directions of the ring 19 and the spool 4) is located closer to an inner peripheral surface of the large-diameter cylindrical portion 4b of the spool 4. At this time, the other end 20b may be in contact or not in contact with the inner peripheral surface of the large-diameter cylindrical portion 4b but non-contact is preferable. Moreover, an intermediate portion 20c located between the one end 20a and the other end 20b is capable of plastic deformation, and in the normal time illustrated in FIG. 3, the intermediate portion 20c has a substantially U-shape by folding so as to project toward a rotation direction (counterclockwise direction in the figure) along the belt extracting direction of the spool 4.

As a material applied to the plate member 20, a metal material capable of plastic deformation is used, and particularly, stainless steel and soft steel are preferable. Moreover, a width of the plate member 20 (axial direction of the torsion bar 5) at that time is 4.0 to 10.0 mm, and a thickness of the plate member 20 is 1.5 to 2.5 mm. Furthermore, load setting (a load indicated on a vertical axis from points D-E in FIG. 8 which will be described later) absorbed by the plate member 20 at that time is preferably within a range of 1.0 to 2.5 kN.

The material, width and thickness are optional and are employed as appropriate in accordance particularly with a car model and the like. As an example, in the case of a standard-sized automobile of a sedan type or the like in which a distance between the occupant (driver) and a distal end of the vehicle can be easily ensured, if a stainless steel is used as the metal material, its width is 5 to 8 mm and its thickness is 1.8 to 2.2 mm.

Similarly, in the case of a station wagon vehicle or the like in which the distance between the occupant (driver) and the distal end of the vehicle can be ensured to some degree, if stainless steel is used as the metal material, its width is 4 to 6 mm, and its thickness is 1.5 to 1.9 mm.

Moreover, in the case of a light motor vehicle in which the distance between the occupant (driver) and the distal end of the vehicle cannot be ensured easily, if stainless steel is used as the metal material, its width is 8 to 10 mm, and its thickness is 2.1 to 2.5 mm.

On the other hand, on the inner peripheral surface of the large-diameter cylindrical portion 4b of the spool 4, a projecting portion 4c (first projecting portion) which is brought into contact with the other end 20b of the plate member 20 after an impact absorbing load of the torsion bar 5 becomes constant after the torsion bar 5 starts rotating integrally with the large-diameter cylindrical portion 4b and imparts a load due to plastic deformation of the plate member 20 in further rotation of the large-diameter cylindrical portion 4b is integrally projected and formed (the projecting portion 4c may be separate from the spool 4).

A separation distance in the belt extracting direction of the large-diameter cylindrical portions 4b from this projecting portion 4c to the other end 20b is to ensure time from when the large-diameter cylindrical portion 4b starts rotation until when the projecting portion 4c is brought into contact with the other end 20b, that is, a time period (between points B-C in FIG. 8 which will be described later) during which the impact absorbing load of the torsion bar 5 is constant after the torsion bar 5 starts rotating integrally with the large-diameter cylindrical portion 4b. Therefore, the separation distance in the belt extracting direction of the large-diameter cylindrical portion 4b from the projecting portion 4c to the other end 20b is preferably separated by a ¼ round or more of the large-diameter cylindrical portion 4b. In this case, a time period during which the impact absorbing load of the torsion bar 5 becomes constant can be sufficiently ensured.

At this time, the separation distance along the belt winding direction from the other end 20b to the projecting portion 4c can be changed in accordance with a distance between the occupant (driver) and the distal end of the vehicle by the above described car model (standard-sized automobile, wagon vehicle, light motor vehicle and the like), and in the case of the standard-sized automobile, the vicinity of a ¾ round can be set, in the case of the wagon vehicle, the vicinity of a ⅔ round can be set, and in the case of the light motor vehicle, the vicinity of a ¼ round can be set, for example.

An operation of the retractor device 1 of the present embodiment configured as above will be described below.

(I) Normal Time

First, when the seatbelt is not worn, the seatbelt 3 is fully wound by an urging force of the spring means 8. Then, if the seatbelt 3 is extracted to be worn at a normal speed, the spool 4 (large-diameter cylindrical portion 4b) is rotated in the seatbelt extracting direction, and the seatbelt 3 is smoothly extracted. The tongue 104 provided slidably on the extracted seatbelt 3 is inserted in and locked by a buckle (not shown) of the buckle device 105 provided on the vehicle body and then, the seatbelt 3 having been excessively extracted is wound around the spool 4 by the urging force of the spring means 8, and the seatbelt 3 fits the occupant to a degree that a pressing feeling is not given.

(II) Emergency

In an emergency, first, the belt winding torque generated in the pre-tensioner 9 is transmitted to the spool 4 via the bush 10. The spool 4 winds the seatbelt 3 by a predetermined amount, and the occupant is rapidly restrained.

On the other hand, the deceleration sensing means 6 is operated by a large vehicle deceleration generated at an emergency, and rotation of the lock gear 13 in the seatbelt extracting direction is prevented, the pawl 11 of the lock mechanism 7 is rotated and engaged with the internal tooth 14 on the side wall of the frame 2. Then, since rotation of the locking base 12 and the torsion bar 5 in the seatbelt extracting direction is prevented, a tensile force of the seatbelt 3 restraining the occupant who is to move forward by an inertia force becomes a relative rotational force in the seatbelt extracting direction with respect to the torsion bar 5 of the spool 4, and only the spool 4 relatively rotates in the seatbelt extracting direction while the torsion bar 5 is being twisted.

Subsequently, if the relative rotation reaches a certain level or more, first, the torsion bar 5 generates plastic deformation by a torsional force on the basis of the relative rotation and absorbs collision energy by plastic deformation resistance at this time. Moreover, along with this operation, the plate member 20 provided between the ring 19 rotating with the locking base 12 and the spool 4 relatively rotating with respect to the same is wound around an outer periphery of the ring 19 in the seatbelt extracting direction while generating plastic deformation and further absorbs the collision energy by the plastic deformation resistance at this time.

A behavior caused by a shape change along a time series of the plate member 20 at this time will be described by FIGS. 4 to 7 corresponding to cross sectional views by the II-II section in FIG. 2 (illustration of torsional rotation displacement of the torsion bar 5 is omitted for facilitation of understanding, though) and FIG. 8 which is a graph illustrating a load change when the impact load is absorbed in the retractor device. In FIG. 8, a period from the point A to a point B indicates a load change caused by plastic deformation by the torsional force of the torsion bar 5. A cross sectional surface on the II-II section in FIG. 2 between the point 13 and a point C corresponds to FIG. 4, a cross sectional surface at the point C corresponds to FIG. 5, a cross sectional surface at a point E corresponds to FIG. 6, and a cross sectional surface at a point F and after corresponds to FIG. 7.

Figure 4:
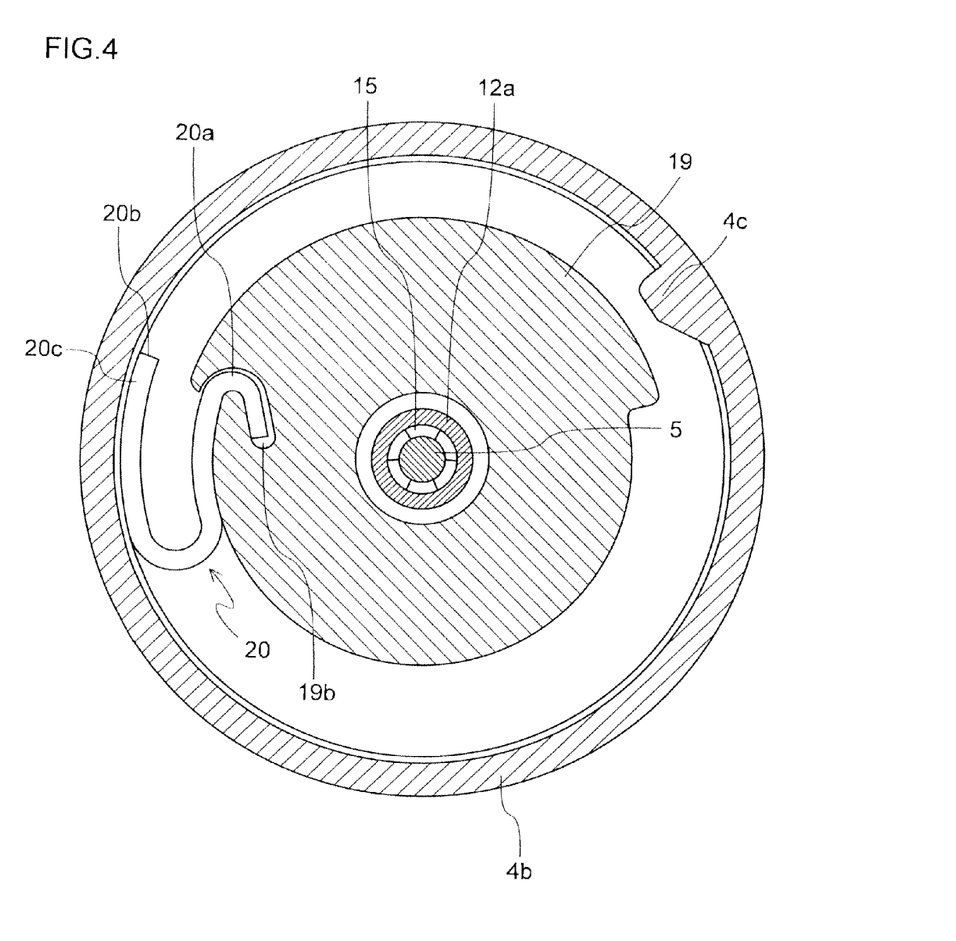
FIG. 4 is a cross sectional view illustrating a state of a shape change along a time series of the plate member.

As illustrated in FIG. 4, at the beginning, the spool 4 relatively rotates (counterclockwise in the figure) with respect to the torsion bar 5, and the projecting portion 4c revolves in the counterclockwise direction along with the rotation. That is, the projecting portion 4c idles without being in contact with the other end 20b. In this period (idling period) is, as illustrated in FIG. 8, a flat period in which the impact absorbing load from the point B to the point C is constant.

Figure 5:
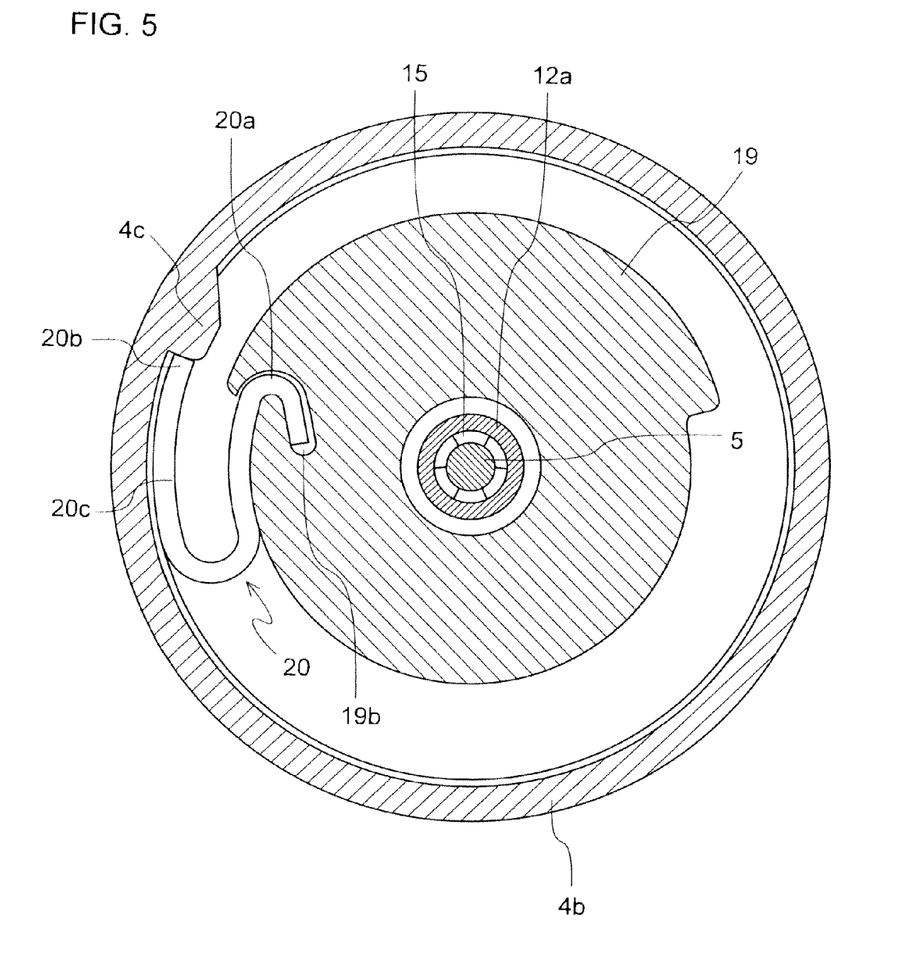
FIG. 5 is a cross sectional view illustrating a state of a shape change along a time series of the plate member.

Subsequently, as illustrated in FIG. 5, if the projecting portion 4c is brought into contact with the other end 20b, the plate member 20 starts plastic deformation and absorbs the impact load along with movement of the projecting portion 4c accompanying the further rotation of the spool 4. At this time, a period from the point C to the point D in FIG. 8 is an initial period in which a load along with start of the plastic deformation of the plate member 20 applies, and a period from the point D to the point E is a plastic deformation stabilized period of the plate member 20.

Figure 6:
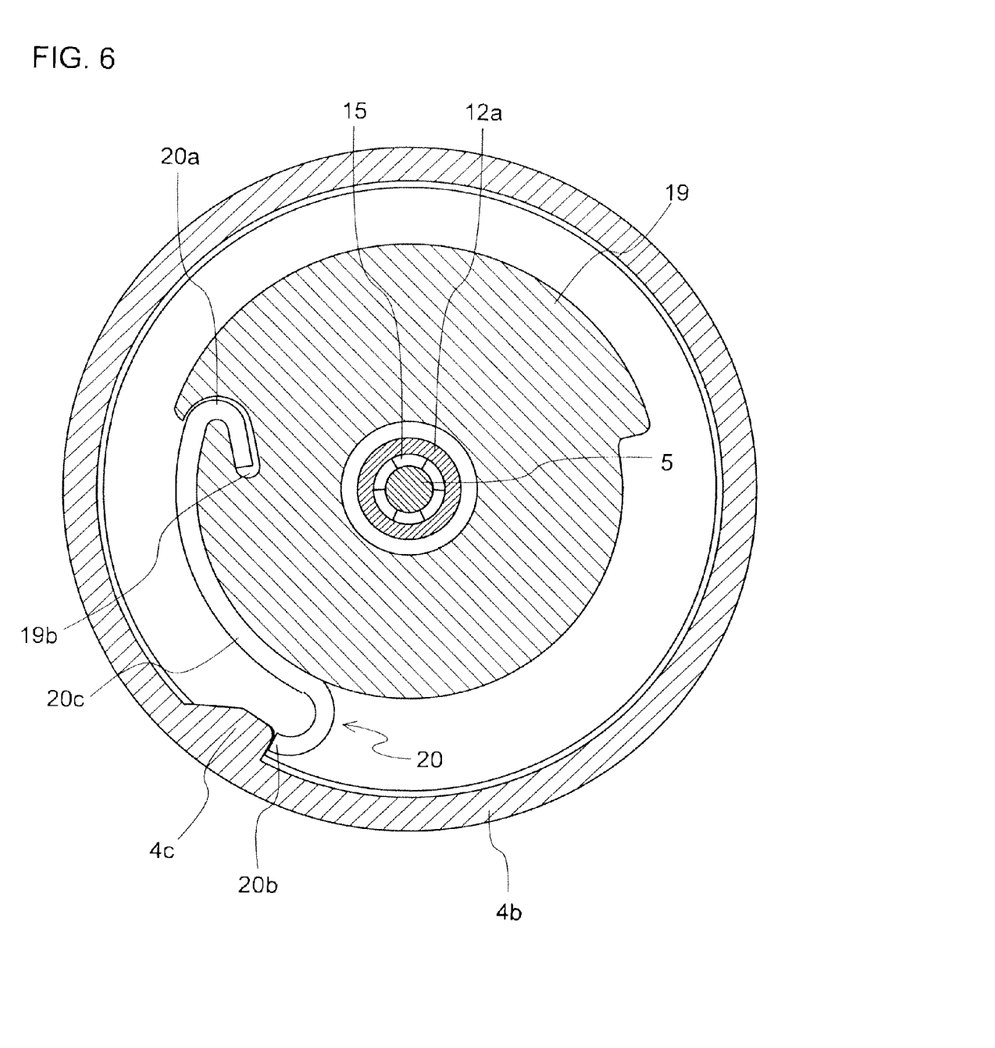
FIG. 6 is a cross sectional view illustrating a state of a shape change along a time series of the plate member.
Figure 7:
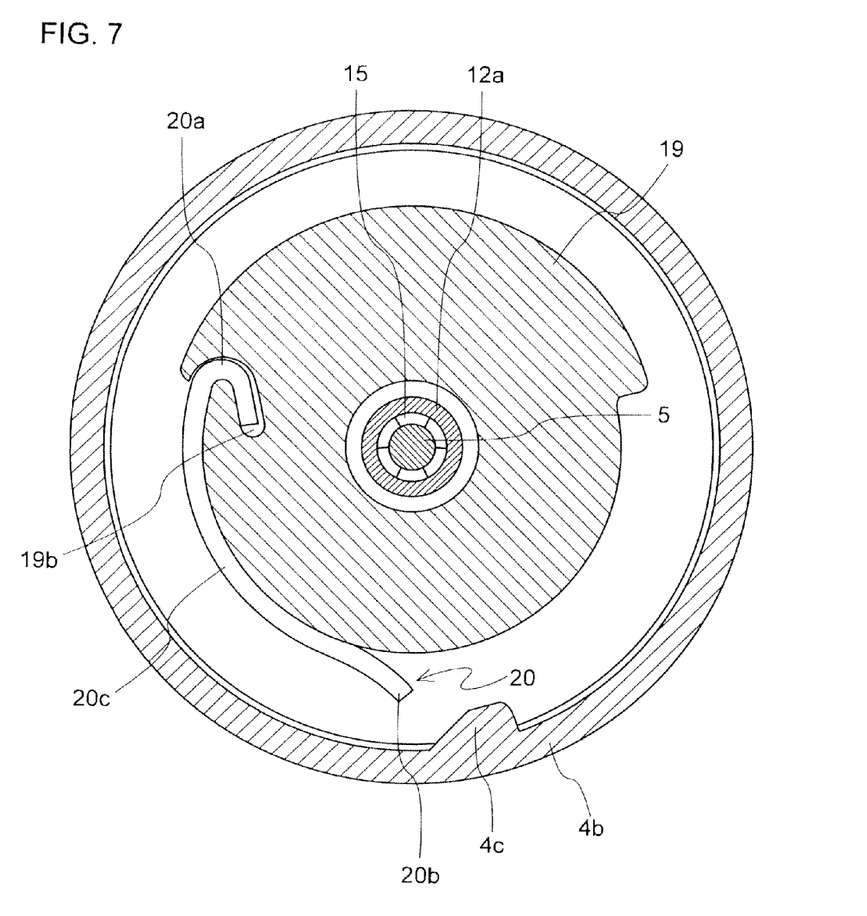
FIG. 7 is a cross sectional view illustrating a state of a shape change along a time series of the plate member.
Figure 8:
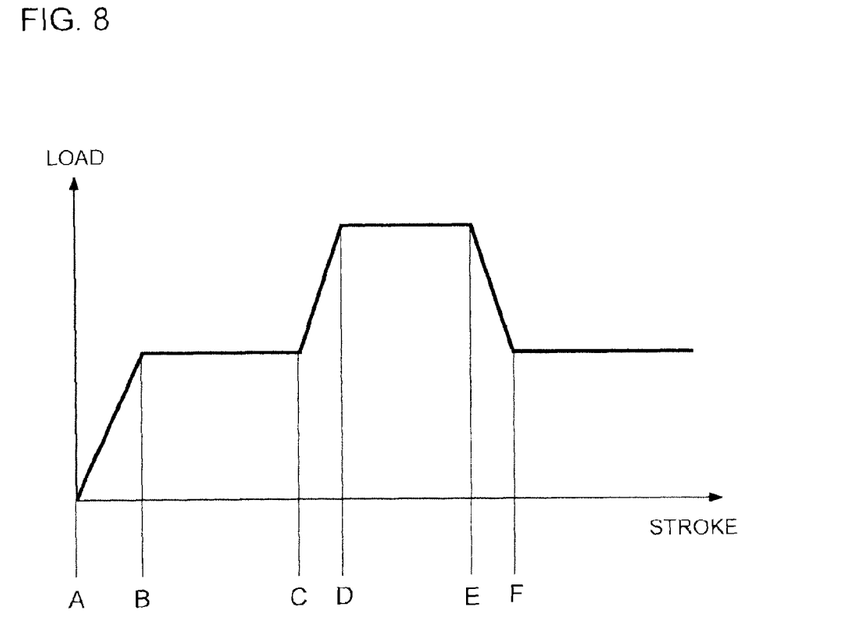
FIG. 8 is a graph illustrating a change of a load absorbing characteristic when an impact load is absorbed.

Moreover, as illustrated in FIG. 6, if the projecting portion 4c is to exit from a state in contact with the other end 20b, a plastic deformation force (load) of the plate member 20 becomes gentle, and as illustrated in FIG. 7, the projecting portion 4c exits from the other end 20b. A period from the point E to the point F in FIG. 8 is a load change period in a process from FIG. 6 to FIG. 7, and a period at the point F and after in FIG. 8 is a separation period in which the plate member 20 is not involved.

As described above, in the present embodiment, in the relative rotation in the seatbelt extracting direction while the torsion bar 5 is twisted by the spool 4, the plastic deformation of the torsion bar 5 and the plastic deformation of the plate member 20 both function as the energy absorbing mechanism (EA mechanism), and an entire energy absorbing load is a sum of the energy absorbing load when the torsion bar 5 generates torsional deformation and the energy absorbing load when the plate member 20 is wound around an outer periphery of a plate mounting member. Then, the impact energy of the occupant is absorbed and alleviated by the torsional torque in the plastic deformation of the torsion bar 5 and the plastic deformation of the plate member 20, and a load applied to the seatbelt 3 is limited.

At this time, in the present embodiment, an upper limit value is provided for the above described stroke by the above described relative rotation lock member 18. That is, along with the relative rotation in the belt extracting direction of the spool 4 with respect to the locking base 12, the relative rotation lock member 18 moves to the right in the axial direction in FIG. 2. Then, if the relative rotation lock member 18 has moved to the end of the male screw of the locking base 12, since it cannot move further to the right in the axial direction, the rotation is locked and is no longer relatively rotated with respect to the locking base 12. As a result, the spool 4 is not relatively rotated, either, with respect to the locking base 12. That is, the rotation in the belt extracting direction of the spool 4 is locked, and the seatbelt 3 is no longer extracted, and thus, inertia movement of the occupant is prevented by the seatbelt 3 and restrained.

According to the present embodiment having been described, the following effects can be obtained.

(1) Optimization of Energy Absorbing Characteristics

As described above, in the present embodiment, after the impact absorbing load of the torsion bar 5 becomes constant (after the B-C period in FIG. 8 has been passed), an impact absorbing load portion by the plastic deformation of the plate member 20 is applied. By shifting the impact absorbing timing of the torsion bar 5 and the plate member 20 from each other as above, it is possible to easily change the energy absorbing characteristics by the entire retractor device 1. As a result, recent needs can be handled, and the energy adsorbing characteristics can be easily optimized in accordance with a difference in a vehicle structure, a vehicle model and the like or a body build of an occupant.

(2) Effect by Locking/Separation of the Plate Member 20

According to the retractor device 1 of the present embodiment, the other end 20*b* of the plate member 20 separates from the projecting portion 4*c* in a later stage of the collision, and the plate member 20 no longer absorbs the collision energy after that. As a result, as illustrated in FIG. 8, it becomes possible to make setting such that the energy is absorbed only by the plastic deformation of the torsion bar 5 after that. Therefore, in addition to the effect of the above described (1), a magnitude of the impact energy absorbing load and an energy absorbing area by the retractor device 1 can be further freely changed and set in this meaning, too, and optimization can be realized further flexibly.

Figure 9:
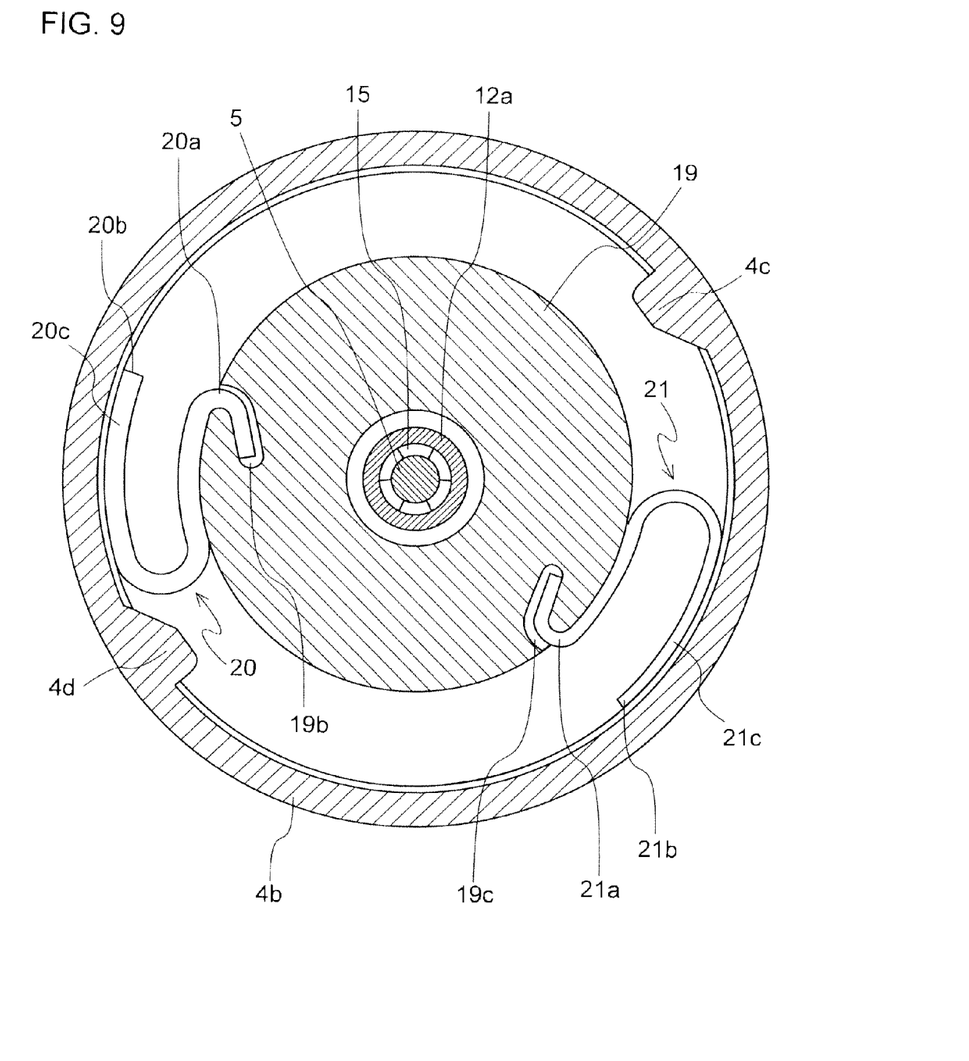
FIG. 9 is a cross sectional view of an essential part, illustrating a modification in which two types of the plate members are provided.
Figure 10:
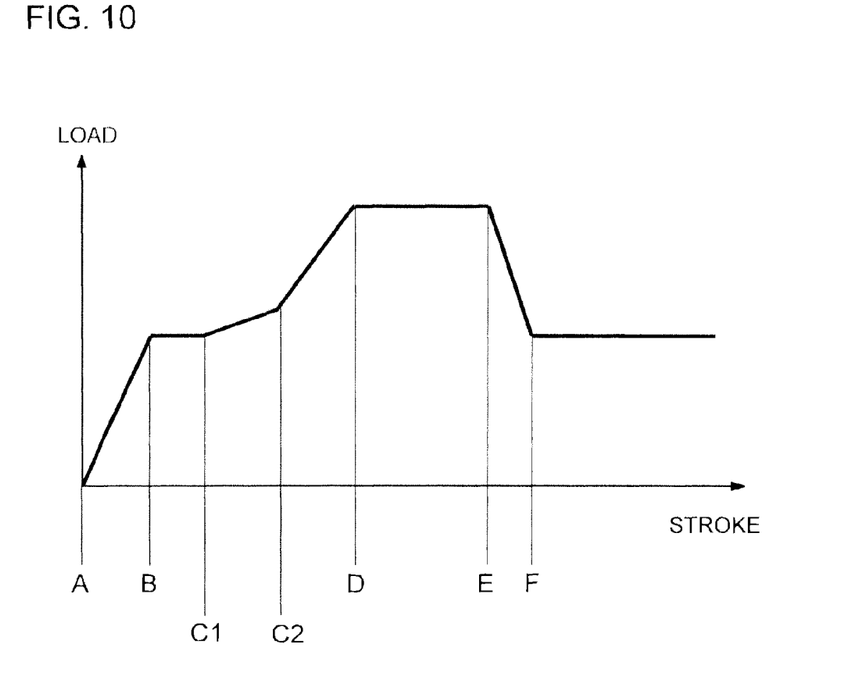
FIG. 10 is a graph illustrating a change of the load absorbing characteristic when an impact load is absorbed.

The present invention is not limited to the above described embodiment and is capable of various variations within a range not departing from its gist. FIGS. 9 and 10 illustrate such modifications. FIG. 9 is a sectional view of an essential part corresponding to FIG. 3 of the above described embodiment, and FIG. 10 is a graph illustrating a load change in impact load absorption corresponding to FIG. 8 of the above described embodiment. The same reference numerals are given to the portions equal to those in the above described embodiment, and the explanation will be omitted or simplified.

As illustrated in FIG. 9, in this modification, two types of the plate members, that is, the plate member 20 (first plate member) and a plate member 21 (second plate member) are provided on the ring 19. For this plate member 21, the one having a thickness smaller than that of the plate member 20 is used, for example. As a result, a maximum withstand load can be made different such that the maximum withstand load for the plate member 20 is 1.5 kN and the maximum withstand load for the plate member 21 is 1.0 kN, for example, and the plate member 21 can have strength that allows easier plastic deformation than the plate member 20. As a result, stepped impact absorption can be set more gently.

Moreover, the plate member 21 has its one end 21*a* (insides in the radial directions of the ring 19 and the spool 4) firmly fitted in and held by a fitting recess portion 19*c* having a substantially U-shaped portion opened to the outer periphery of the ring 19 by an appropriate method. Moreover, the other end 21*b* of the plate member 21 (free end outsides in the radial directions of the ring 19 and the spool 4) is located closer to the inner peripheral surface of the large-diameter cylindrical portion 4*b* of the spool 4. At this time, the other end 21*b* may be in contact or not in contact with the inner peripheral surface of the large-diameter cylindrical portion 4*b* but non-contact is preferable. Moreover, an intermediate portion 21*c* located between the one end 21*a* and the other end 21*b* is capable of plastic deformation.

Moreover, on the large-diameter cylindrical portion 4*b*, in addition to the projecting portion 4*c* to be brought into contact with the other end 20*b* of the plate member 20, a projecting portion 4*d* (second projection portion) to be brought into contact with the other end 21*b* of the plate member 21 is integrally projected and formed. At this time, regarding the projecting portion 4*c* and the other end 20*b* as well as the projecting portion 4*d* and the other end 21*b*, separation distances are set so that the contact between the projecting portion 4*d* and the other end 21*b* occurs earlier than the contact between the projecting portion 4*c* and the other end 20*b*.

As a result, if the spool 4 rotates in an emergency, the projecting portion 4*d* is brought into contact with the other end 21*b* and the plate member 21 starts plastic deformation and then, the projecting portion 4*b* is brought into contact with the other end 20*b* and starts plastic deformation and thus, the magnitude of the impact absorbing load can be applied in a stepped manner. That is, a period from the point B to a point C1 illustrated in FIG. 10 corresponds to a period during which the impact absorbing load is constant and corresponding to the points B-C period illustrated in FIG. 8, a period between the points C1-C2 is an impact absorbing load period only by the plate member 21, and a period between the points C2-D indicates the impact absorbing load period in which the impact absorption by the plate member 20 is added to the impact absorption by the plate member 21.

In the present modification, as described above, by making the magnitudes of the impact absorbing loads of the two types of plate members 21 and 20 and by setting the impact absorbing timings such that the timing of the plate member 21 on a small load side comes first and then, the timing of the plate member 20 on a large load side, the impact absorbing load can be set further finely.

At that time, by arranging/forming the plate members 20 and 21 and the projecting portions 4*c* and 4*d* on the same round of the large-diameter cylindrical portion 4*b*, the size can be made smaller than those provided in the axial direction of the torsion bar 5. Moreover, since the plate members 20 and 21 can be set having lengths not interfering with each other both in the normal time and in emergency (when plastic deformation is completed), they do not have to be provided in the axial direction of the torsion bar 5, and a stepped impact absorbing load can be set easily without simultaneous action of the plurality of impact absorbing members.

Regarding the projecting portions 4*c* and 4*d*, by forming a plurality of female screw holes on the inner peripheral surface of the large-diameter cylindrical portion 4*b* and by making the projecting portions 4*c* and 4*d* capable of being screwed at an arbitrary position, for example, timing control according to the vehicle model and the like can be easily executed before assembling of the retractor device 1.

Other than those described above, the above described embodiment and the method of each of the modifications may be combined with each other in use as appropriate.

Though not individually exemplified, the present invention is put into practice with various changes added within a range not departing from the gist thereof.

What is claimed is:

1. A retractor device for a seatbelt, comprising:
   a substantially cylindrical member rotatable for winding the seatbelt;
   a shaft member capable of torsional deformation arranged coaxially on an inside of said substantially cylindrical member and connected rotatably integrally with said substantially cylindrical member;
   a plate mounting member arranged on a shaft end portion of said substantially cylindrical member and connected rotatably integrally with an outer peripheral portion of said shaft member on the other side in an axial direction;
   a lock mechanism which can prevent rotation of said plate mounting member in a seatbelt extracting direction;
   a plastic-deformable first plate member having one end side fixed to an outer peripheral portion of said plate mounting member and the other end side being a free end in the vicinity of an inner peripheral portion of said shaft end portion of said substantially cylindrical member; and a first projecting portion which is provided projecting from the inner peripheral surface of said substantially cylindrical member, which is brought into contact with said the other end side of said first plate member after said shaft member starts rotating integrally with said substantially cylindrical member and an impact absorbing load of said shaft member becomes constant due to said torsional deformation, and which imparts a load for plastically deforming said first plate member in further rotation of said substantially cylindrical member.

2. The retractor device for a seatbelt according to claim 1, wherein:

the other end side of said first plate member and said first projecting portion are separated from each other by a ¼ round or more along a circumferential direction of said substantially cylindrical member.

3. The retractor device for a seatbelt according to claim 1, further comprising:

a second plate member capable of plastic deformation and having one end side fixed to the outer peripheral portion of said plate mounting member and the other end side being a free end in the vicinity of the inner peripheral portion of said shaft end portion of said substantially cylindrical member; and a second projecting portion which is provided projecting from a portion on a side opposite to a movement trajectory on the same round of said first plate member and said first projecting portion in the inner peripheral surface of said substantially cylindrical member until said first projecting portion is brought into contact with the other end side of said first plate member along with rotation of said substantially cylindrical member and which is brought into contact with said the other end side of said second plate member so as to impart a load for plastically deforming said second plate member, wherein said second plate member is fixed to the outer peripheral portion of said plate mounting member so that a movement trajectory along with rotation of said substantially cylindrical member until said second projecting portion is brought into contact with the other end of said second plate member is shorter than the movement trajectory until said first projecting portion is brought into contact with the other end of said first plate member.

4. The retractor device for a seatbelt according to claim 3, wherein:

said second plate member is configured having a strength which allows easier plastic deformation than said first plate member.

5. A seatbelt device comprising:

a seatbelt for restraining an occupant;

a retractor device for the seatbelt which winds one side of said seatbelt, capable of being extracted;

a tongue provided at said seatbelt; and a buckle device for causing the occupant to wear said seatbelt by being engaged with said tongue, wherein said retractor device of the seatbelt includes:

a substantially cylindrical member rotatable for winding the seatbelt;

a shaft member capable of torsional deformation arranged coaxially on an inside of said substantially cylindrical member and connected rotatably integrally with said substantially cylindrical member;

a plate mounting member arranged on a shaft end portion of said substantially cylindrical member and connected rotatably integrally with an outer peripheral portion of said shaft member on the other side in an axial direction;

a lock mechanism which can prevent rotation of said plate mounting member in a seatbelt extracting direction;

a plastic-deformable first plate member having one end side fixed to an outer peripheral portion of said plate mounting member and the other end side being a free end in the vicinity of an inner peripheral portion of said shaft end portion of said substantially cylindrical member; and a first projecting portion which is provided projecting from the inner peripheral surface of said substantially cylindrical member, which is brought into contact with said the other end side of said first plate member after said shaft member starts rotating integrally with said substantially cylindrical member and an impact absorbing load of said shaft member becomes constant due to said torsional deformation, and which imparts a load for plastically deforming said first plate member in further rotation of said substantially cylindrical member.

* * * * *